United States Patent [19]

Takemura et al.

[11] Patent Number: 5,473,449
[45] Date of Patent: Dec. 5, 1995

[54] LIQUID CRYSTAL DISPLAY WITH A FERROELECTRIC FILM CONTROL LAYER

[75] Inventors: Yasuhiko Takemura; Toshimitsu Konuma, both of Kanagawa; Shunpei Yamazaki, Tokyo, all of Japan

[73] Assignee: Semiconductor Energy Laboratory Co., Ltd., Kanagawa, Japan

[21] Appl. No.: 95,767

[22] Filed: Jul. 23, 1993

[30] Foreign Application Priority Data

Jul. 24, 1992 [JP] Japan .................... 4-218325

[51] Int. Cl.⁶ .................... G02F 1/1343; G02F 1/13
[52] U.S. Cl. .................... 359/56; 359/100
[58] Field of Search .................... 359/56, 100

[56] References Cited

U.S. PATENT DOCUMENTS 3,725,899  4/1973  Greubel .................... 359/79
4,981,340  1/1991  Kurematsu et al. .................... 350/333

FOREIGN PATENT DOCUMENTS 54-155795  12/1979  Japan .................... 359/56
62-159124   7/1987  Japan .
4-340931   11/1992  Japan .................... 359/56
4-368911   12/1992  Japan .................... 359/56

OTHER PUBLICATIONS

"A New Two–Terminal Device Using Ferrolectric Polymetric Thin Film for Large–Area LCDs", pp. 18–21, Takashi Sato, Atsushi Hatta, Hiroshi Komatsu, SID 91 Digest.

Primary Examiner—Anita Pellman Gross
Assistant Examiner—Charles Miller
Attorney, Agent, or Firm—Sixbey, Friedman, Leedom & Ferguson; Gerald J. Ferguson, Jr.; Karlton C. Butts

[57] ABSTRACT

A liquid crystal display capable of displaying stable images by the use of a ferroelectric film is driven by scanning the screen once per sub-frame having different periods of time which are defined to integrally form a frame within which displaying an image is completed. One or more sub-frames or no sub-frame is selected to generate selection signals for displaying images. The shade of gray can be controlled in accordance with the combination of the selected sub-frames.

7 Claims, 5 Drawing Sheets

FIG.1(A)
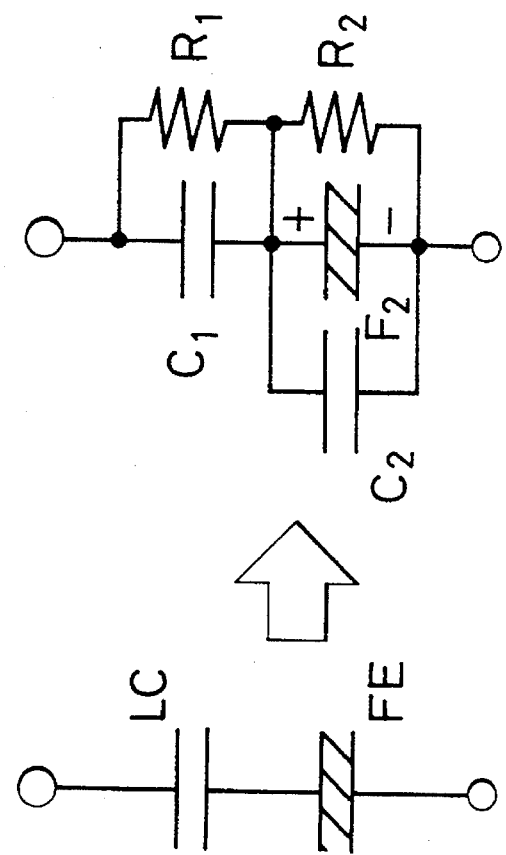
FIG.1(B)
FIG.1(C)
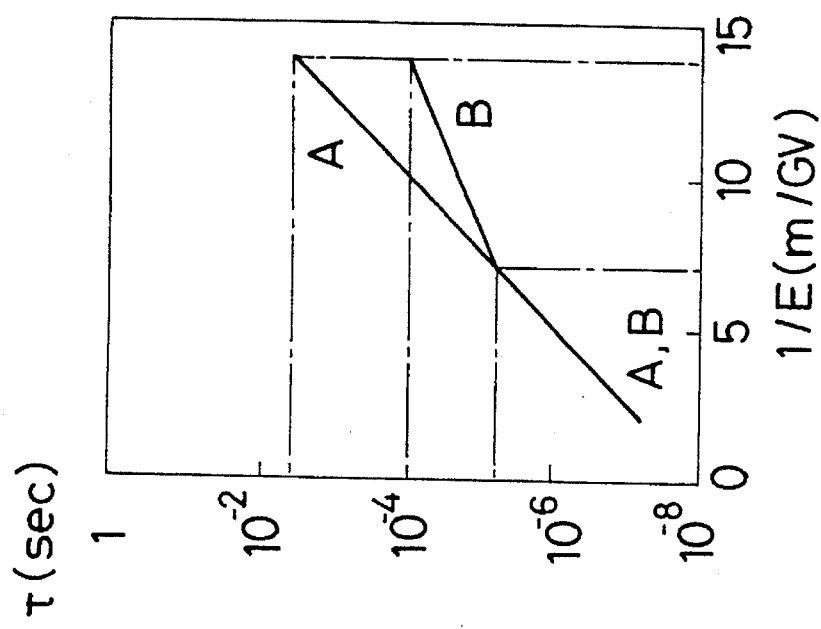

LIQUID CRYSTAL DISPLAY WITH A FERROELECTRIC FILM CONTROL LAYER

BACKGROUND OF THE INVENTION

1. Field of the Invention

The present invention relates in general to an electro-optical device such as a liquid crystal display and a method of driving an electro-optical device such as a liquid crystal display.

2. Description of the Prior Art

There are known two types of liquid crystal displays comprising pixels in matrices, i.e. the simple matrix type and the active matrix type. The former type can be designed in simple structure with large aperture ratios and therefore the production cost is relatively low due to few technical constraints on the manufacturing processes. The contrast of images displayed, however, is not so high because of the dynamic operation. In addition to this, when a nematic liquid crystal material is utilized as the liquid crystal medium, a cross-talking phenomena occurs between adjacent pixels.

Contrary to this, in the case of the liquid crystal display of the active matrix type, cross-talking phenomena are effectively suppressed since the operation of the respective pixels are controlled by active devices such as diodes or transistors. The yield in the manufacture, however, is not so high and there are many constraints on the process because the active devices must be provided for respective pixels, e.g. two devices per one pixel.

Ferroelectric liquid crystal displays or anti-ferroelectric liquid crystal displays can display clear static images with high contrasts by making use of their memory performance. Furthermore, cross-talking is unlikely since the optical characteristics of ferroelectric liquid crystal materials or anti-ferroelectric liquid crystal materials are not modified in accordance with effective voltages unlike in the case of nematic liquid crystal materials. Still further, the response speeds of ferroelectric liquid crystal materials or anti-ferroelectric liquid crystal materials are as high as 10 microseconds or higher, which speeds are higher than those of nematic liquid crystal materials by orders of magnitude.

The high memory performance of ferroelectric liquid crystal materials or anti-ferroelectric liquid crystal materials, however, serves to cause the so-called "afterimage" when a displayed image is maintained for a long time, because of a certain type of degradation of the liquid crystal materials. Of course, if the liquid crystal material having a high memory performance is replaced by another liquid crystal material having a low memory performance in order to avoid the undesirable "afterimage", it is difficult to display clear static images with high contrasts. The image becomes unsightly particularly at a high temperature in this case.

The applicants have proposed a new type of liquid crystal display capable of displaying clear static images with high contrasts by combining a ferroelectric liquid crystal or an anti-ferroelectric liquid crystal and an organic ferroelectric material, e.g. the copolymer of vinylidene fluoride and trifluoroethylene. This technique has been described in Japanese Patent Application No. sho 61-1152.

It is difficult, however, to display grayscale images by the new type display since the optical characteristics of ferroelectric liquid crystal materials or anti-ferroelectric liquid crystal materials are not modified in accordance with effective voltages. Because of this, shades of gray are accomplished only in accordance with the area adjustment technique or the frame control technique. In accordance with the former technique, one pixel has to comprise a plurality of sub-pixels for making it possible to display images in many shades of gray so that the process becomes substantially complicated to require a high cost. In accordance with the later technique, it is likely that flickering may occur.

BRIEF SUMMARY OF THE INVENTION

It is an object of the present invention to provide a method of driving an electro-optical device for displaying images in shades of gray.

It is another object of the present invention to provide a method of driving an electro-optical device for displaying clear images with a high contrast ratio.

It is a further object of the present invention to provide an electro-optical device of the simple matrix type which can be manufactured at a low production cost.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, a liquid crystal display capable of displaying stable images by the use of a ferroelectric film is driven by scanning the screen once per sub-frame having different periods of time which are defined to integrally form a frame within which displaying an image is completed. A method of driving an electro-optical device comprising a pixel which comprises a ferroelectric film and an electro-optical modulating layer comprising a material selected from the group consisting of a ferroelectric liquid crystal and an anti-ferroelectric liquid crystal, said ferroelectric film and said electro-optical modulating layer being provided between a pair of electrodes, said method comprising the step of:

supplying signals to said electrodes during a frame comprising N sub-frames, wherein said N sub-frames have different durations from one another where N is a natural number of 2 or more.

In preferred embodiments, said N sub-frames have durations of $T_0, 2T_0, 2^2T_0, \ldots, 2^{N-1}T_0$, respectively where N is a natural number of 2 or more. The signals comprise a signal comprising a positive and a negative pulse applied to one of the electrodes.

In accordance with one aspect of the present invention, the driving method is suitable for a liquid crystal display comprising first and second transparent substrates, a first electrode arrangement consisting of a plurality of first parallel strips formed on the inside surface of the first substrate, a second electrode arrangement consisting of a plurality of second parallel strips formed on the inside surface of the second substrate and extending perpendicular to the first parallel strips in order to form a plurality of pixels at the intersections between the first and second strips in the form of a matrix, a ferroelectric film located between the first and second strips and a liquid crystal layer disposed between the first and second substrates. The method comprises the steps of scanning the pixels by sequentially applying selection signals to the first strips, and applying data signals to the second strips in synchronism with the selection signals in order to generate selection pulses having sufficiently large absolute values of voltage to control the spontaneous polarization of the ferroelectric film at the respective pixels between the first and second strips for turning on or off the respective pixels in accordance with an image to be displayed. A plurality of sub-frames having different periods of time are defined to integrally form a frame within which displaying an image is completed. The scanning is performed once per sub-frame. One or more sub-frames are selected to generate the selection pulses in order to adjust the shade of gray in accordance with the combination of the selected sub-frames.

In accordance with another aspect of the present invention, the driving method is suitable for a liquid crystal display comprising first and second transparent substrates, a first electrode arrangement consisting of a plurality of first parallel strips formed on the inside surface of the first substrate, a plurality of electrode pads formed on the inside surface of the second substrate and arranged in a matrix, a second electrode arrangement consisting of a plurality of second parallel strips formed on the inside surface of the second substrate over the electrode pads and extending perpendicular to the first parallel strips in order that the intersections between the first and second strips correspond to the electrode pads, a ferroelectric film interposed between the second strips and the electrode pads and a liquid crystal layer disposed between the first and second substrates. The method comprises the steps of scanning the pixels by sequentially applying selection signals to the first strips, and applying data signals to the second strips in synchronism with the selection signals in order to generate a selection pulses having sufficiently large absolute values of voltage to control the spontaneous polarization of the ferroelectric film at the respective pixels between the first and second strips for turning on or off the respective pixels in accordance with an image to be displayed. A plurality of sub-frames having different periods of time are defined to integrally form a frame within which displaying an image is completed. The scanning is performed once per a sub-frame. One or more sub-frames are selected to generate the selection pulses in order to adjust the shade of gray in accordance with the combination of the selected sub-frames.

In accordance with a further aspect of the present invention, a liquid crystal display comprises first and second transparent substrates, a first electrode arrangement consisting of a plurality of first parallel strips formed on the inside surface of the first substrate, a plurality of electrode pads formed on the inside surface of the second substrate and arranged in a matrix, a second electrode arrangement consisting of a plurality of second parallel strips formed on the inside surface of the second substrate over the electrode pads and extending perpendicular to the first parallel strips in order that the intersections between the first and second strips correspond to the electrode pads, a ferroelectric film interposed between the second strips and the electrode pads and a liquid crystal layer disposed between the first and second substrates.

The method of driving liquid crystal displays according to the present invention is suitable for the simple matrix type of liquid crystal display. In the case of liquid crystal displays provided with TFTs for applying controlled voltages to the respective pixels, the voltage levels at the electrode pads of the respective pixels are not stable and varied from pixel to pixel and therefore the analog shading technique has to be employed. The number of shades is usually up to 16 in accordance with the analog technique.

BRIEF DESCRIPTION OF THE DRAWINGS

The accompanying drawings, which are incorporated in and form a part of the invention and, together with the description, serve to explain the principles of the invention.

FIG. 1(A) is a schematic circuit diagram showing one pixel of a liquid crystal display comprising a ferroelectric liquid crystal or an anti-ferroelectric liquid crystal and an organic ferroelectric material.

FIG. 1(B) is an exactly equivalent circuit of one pixel of a ferroelectric liquid crystal or an anti-ferroelectric liquid crystal and an organic ferroelectric material.

FIG. 1(C) is a graphic diagram showing the relationship between the electric field applied to a ferroelectric cell and the time required of the ferroelectric cell to change the direction of polarization.

DETAILED DESCRIPTION OF THE PREFERRED EMBODIMENTS

A new type of liquid crystal display capable of displaying clear static images can be implemented with high contrasts by combining a ferroelectric liquid crystal or an anti-ferroelectric liquid crystal and an organic ferroelectric material, e.g. the copolymer of vinylidene fluoride and trifluoroethylene. One pixel of this liquid crystal display is illustrated in FIG. 1(A). A plurality of such pixels are arranged in a matrix with orthogonal electrode strips, i.e. selection lines (selection electrodes) and data lines extending in parallel in perpendicular directions. Namely, a liquid crystal cell (electro-optical modulating layer) LC and a ferroelectric cell (ferroelectric film) FE are connected in series between two control electrode terminals. FIG. 1(B) is an exactly equivalent circuit of the series connection. The liquid crystal cell LC is divided into a pure capacitance element $C_1$ and a resistance $R_1$. The ferroelectric cell FE is divided into a pure capacitance element $C_2$, a spontaneous polarization $F_2$ and a resistance $R_2$.

A conventional method of driving the liquid crystal display is explained with reference to FIG. 2. The selection signal Vc consisting of successive pairs of high and low pulses is supplied to respective selection lines in order to scan the screen once per the predetermined frame time. Each data line $V_{D1}$ is supplied with data signals representing an image to be displayed on the respective selection lines. When one of the data lines is given a positive signal and one of the selection lines is supplied with the selection signal Vc at the same time, a large positive signal corresponding to the sum of the selection signal and the positive signal is applied to the pixel at the intersection. For example, in FIG. 2, the right pair of positive and negative pulses of the selection signal Vc and the positive signal at the data line $V_{D1}$ occur at the same time so that a large positive signal appears as the effective voltage $V_A$ which represents the voltage applied across the series connection of the liquid crystal cell LC and the ferroelectric cell FE. The ferroelectric cell FE is polarized by the large positive voltage to form a spontaneous polarization which influences the liquid crystal cell. Also, when one of the data lines is given a negative signal and one of the selection lines is supplied with the selection signal Vc at the same time, a large negative signal corresponding to the sum of the selection signal and the negative signal is applied to the pixel at the intersection. For example, the intermediate or left pair of positive and negative pulses of the selection signal Vc and the negative signal at the data line $V_{D1}$ occur at the same time so that a large negative signal appears across the series connection. The ferroelectric cell FE is polarized by the large negative voltage in the opposite direction.

Figure 2:
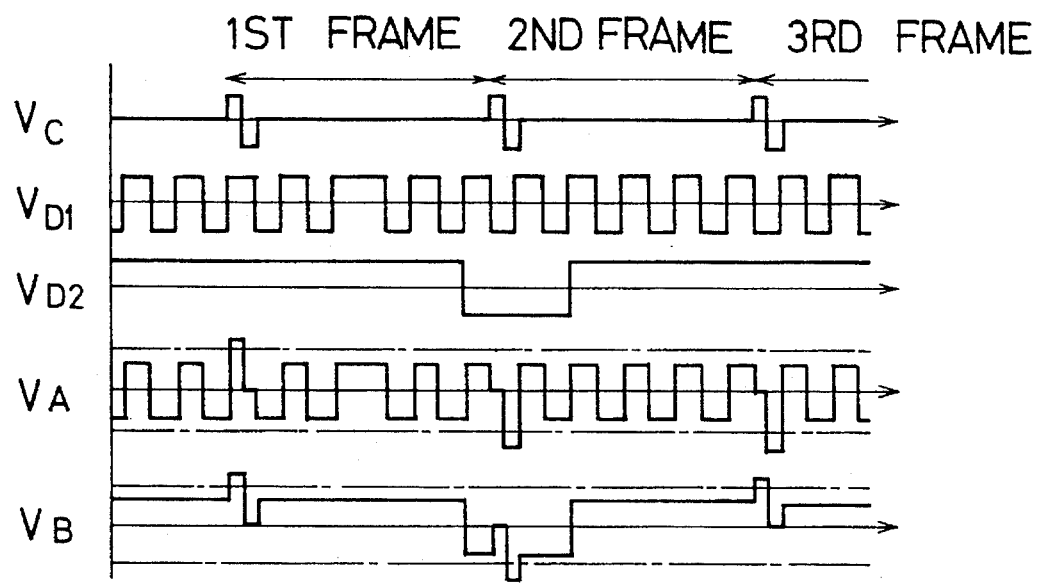
FIG. 2 is a schematic diagram showing a conventional method of driving a liquid crystal display as illustrated in FIG. 1(A).

If the image to be displayed is complicated and therefore the data signals $V_{D2}$ supplied to the data line are finely alternating as illustrated in FIG. 2, the effective voltage $V_A$ becomes also finely alternating. On the contrary, if the image to be displayed is simple and therefore the data signal $V_{D2}$ supplied to the data line consists mainly of DC signals, the effective voltage $V_B$ is also consists mainly of DC signals. Hereinbelow, the influence of the signals applied to the liquid crystal cell LC and the ferroelectric cell FE will be discussed. In this case, the resistances $R_1$ and $R_2$ are assumed to be substantially large so that the attenuation due to the current leakage thereacross can be neglected. The voltage $V_1$ across the liquid crystal cell LC is expressed by the following equation.

$$V_1 = (C_2 V - P_S S_2)/(C_1 + C_2) \qquad (1)$$

wherein $P_S$ is the spontaneous polarization of the ferroelectric cell, $S_2$ is the area of the ferroelectric cell and V is the voltage applied across the series connection of the liquid crystal cell LC and the ferroelectric cell FE. The first term $C_2 V$ is related to the influence of the cross-talking on the pixel. If $C_2 V \ll P_S S_2$, the influence can be neglected.

Figure 4:
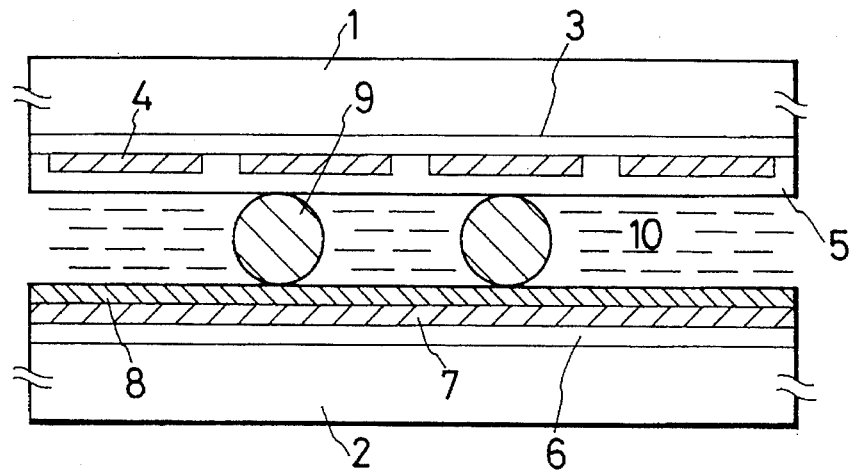
FIG. 4 is a cross sectional view showing a liquid crystal display comprising a ferroelectric liquid crystal or an anti-ferroelectric liquid crystal and an organic ferroelectric film.

If the area $S_2$ of the ferroelectric cell FE and the area $S_1$ of the liquid crystal cell LC are almost equal, the liquid crystal display can be manufactured by a relatively simple process. An example of such a liquid crystal display is illustrated in FIG. 4. The liquid crystal display comprising a pair of glass substrates 1 and 2 provided with a first electrodes arrangement 4 and a second electrodes arrangement 7 at the opposite inside surfaces thereof together with a liquid crystal material inbetween. The first electrodes arrangement 4 is formed on the substrate 1 in a conventional manner. Namely, a plurality of first electrode strips made of a transparent conductive material such as ITO are formed on the substrate 1 through an insulating film 3 made of a silicon oxide film. The first electrodes strips are extending in the normal direction to the drawing sheet and coated with an orientation control film 5 made of polyimide which is given rubbing treatment. The second electrodes arrangement 7 is formed on the substrate 2 in the same manner. Namely, a plurality of second electrode strips made of a transparent conductive material such as ITO are formed on the substrate 2 through an insulating film 6 made of a silicon oxide film. The second electrodes strips are extending in the right and left direction in the drawing sheet in order to provide a number of pixels in a matrix at the intersections of the first and second electrode strips. A ferroelectric film 8 is coated on the substrate 2 over the second electrode strips. The thickness of the ferroelectric film 8 is no smaller than 100 nm when the film 8 is formed of the copolymer of vinylidene fluoride (VDF) and trifluoroethylene (TrFE) and no smaller than 300 nm when the film 8 is formed of barium titanate or PZT($PbZr_{1-x}Ti_xO_3$) in order to obtain effective ferroelectric characteristics. The ferroelectric film 8 may be either in direct contact with the electrodes arrangement 7 or provided on the electrodes arrangement 7 with an insulating material being provided between the ferroelectric film 8 and the electrodes arrangement 7. The copolymer of vinylidene fluoride (VDF) and trifluoroethylene (TrFE) is referred to as P(VDF+TrFE) for short. These substrates 1 and 2 are joined with a liquid crystal material therebetween. The numeral 9 designates spacers which maintain an appropriate thickness of the liquid crystal layer 10. The manufacturing process of this configuration can be completed only with two steps for patterning the respective films in the same manner as in the process for manufacturing conventional liquid crystal displays. Furthermore, the design rule of the process is only 1/10 of the width of the strips.

In this case, the capacitance $C_1$ of the liquid crystal cell LC is $\epsilon_1 S_1/d_1$ where $\epsilon_1$ is the dielectric constant of the liquid crystal material, $S_1$ is the area of the liquid crystal cell LC and $d_1$ is the thickness of the liquid crystal cell LC. On the other hand, the capacitance $C_2$ of the ferroelectric cell FE is $\epsilon_2 S_2/d_2$ where $\epsilon_2$ is the dielectric constant of the ferroelectric cell FE, $S_2$ is the area of the ferroelectric cell FE and $d_2$ is the thickness of the ferroelectric cell FE. Since $S_1 = S_2$, the equation (1) is rewritten in the form of $$V_1 = (\epsilon_2 V/d_2 - P_S)/(\epsilon_1/d_1 + \epsilon_2/d_2) \qquad (2).$$

In the above equation, the second term is the offset voltage which is always applied to the liquid crystal cell LC. This offset voltage does not exceed the critical voltage with which the liquid crystal cell LC can no longer perform its normal operation. On the other hand, the voltage across the ferroelectric cell FE is expressed by the equation, $$V_2 = (\epsilon_1 V/d_1 + P_S)/(\epsilon_1/d_1 + \epsilon_2/d_2) \qquad (3).$$

In the case that $d_1 \ll d_2$ and both $\epsilon_1$ and $\epsilon_2$ are of the order of $10\epsilon_0$, i.e. $10^{-10}$, the equation (2) is rewritten in the form of $$V_1 \approx (\epsilon_2 V/d_2 - P_S) d_1/\epsilon_1 - P_S d_1/\epsilon_1 \qquad (4).$$

Accordingly, the influence of data for other pixels is hardly exerted upon each pixel in this case. On the other hand, in such a case, the equation (2) is rewritten in the form of $$V_2 = V + P_S d_1/\epsilon_1 \qquad (5).$$

If Ec is the electric field required for inverting the polarization direction of the ferroelectric cell FE, $V_2$ is to be large as $Ec \cdot d_2$, when the data displayed is rewritten, so that 2 V is as large as $Ec \cdot d_1$. In the case of a usual polymer having Ec of about 100 MV/m, the applied voltage V across the liquid crystal cell LC and the ferroelectric must be substantially larger than 100 V for driving a liquid crystal display composed of a one micron thick liquid crystal layer. This is not a realistic case. No polymer is therefore available. The electric field required for inverting the polarization direction of the ferroelectric cell FE, however, is as low as 1 MV/m if the ferroelectric cell FE is made of barium titanate so that the applied voltage V is only of the order of 10 V.

On the other hand, in the case that $d_2 \ll d_1$, the equation (2) is rewritten in the form of $$V_1 = V - P_S d_2/\epsilon_2 \qquad (6).$$

The influence of data for other pixels is substantially exerted upon each pixel in this case. The voltage across the liquid crystal cell LC and the ferroelectric is applied mainly across the liquid crystal cell LC. Accordingly, it is difficult to form the ferroelectric cell unless $P_S$ is particularly large and Ec is particularly small.

Figure 5A:
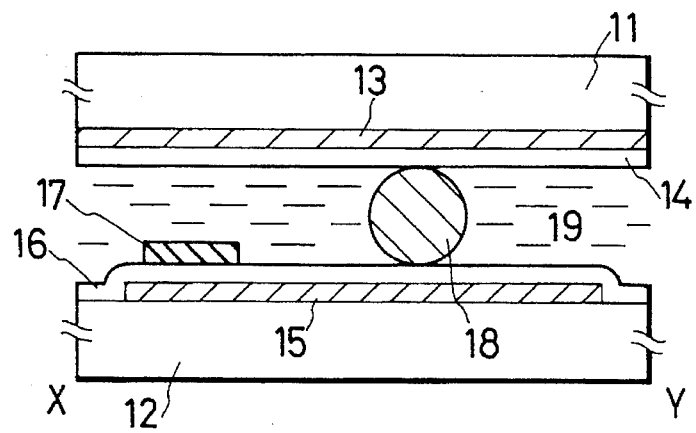
FIG. 5(A) is a cross sectional view showing a liquid crystal display comprising a ferroelectric liquid crystal or an anti-ferroelectric liquid crystal and an organic ferroelectric film in accordance with the present invention.
Figure 5B:
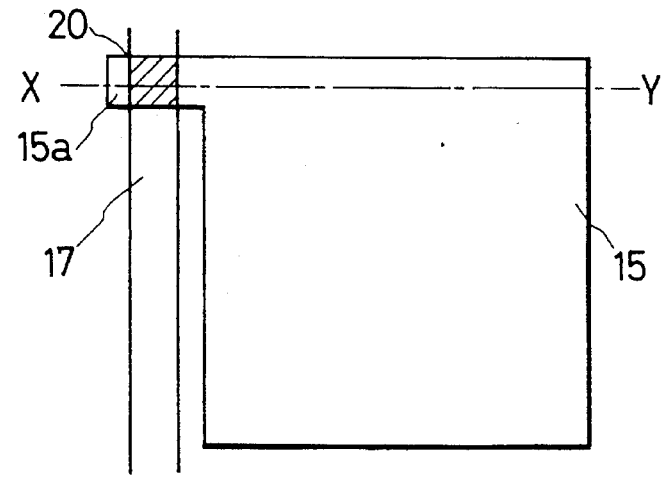
FIG. 5(B) is a plan view showing an electrode pad coupling with a narrow line in a pixel of a liquid crystal display comprising a ferroelectric liquid crystal or an anti-ferroelectric liquid crystal and an organic ferroelectric film in accordance with the present invention.

Next, another case is examined with reference to FIG. 5(A) illustrating a liquid crystal display according to the present invention in which the area $S_2$ of the ferroelectric cell is substantially smaller than the area $S_1$ of the liquid crystal cell LC. The liquid crystal display comprising a pair of glass substrates 11 and 12 provided with a first electrodes arrangement 13 (in the form of strip or plane) and a plurality of electrode pads 15 at the opposite inside surfaces thereof together with a liquid crystal material inbetween. The first electrodes arrangement 13 is formed on the substrate 11 in a conventional manner. Namely, a plurality of first electrode strips made of a transparent conductive material such as ITO are formed on the substrate 11. The first electrodes strips are extending in the parallel direction (right-to-left) to the drawing sheet and, if desired, coated with an orientation control film 14 made of polyimide which is given rubbing treatment. The electrodes pads 15 are formed from ITO on the substrate 12 in the form of square pads arranged in a matrix corresponding to the pixels of the liquid crystal display as illustrated in FIG. 5(B). The size of the square pads is for example 300 microns×250 microns. A ferroelectric film 16 is coated on the substrate 12 over the second electrode arrangement 15. For example, the ferroelectric film 16 is made of P(VDF+TrFE) and the thickness of the ferroelectric film 16 is 200 nm. Furthermore, narrow parallel lines (linear wirings) 17 are formed of aluminum or ITO on the ferroelectric film 16 coated over the second substrate 12. The width of the narrow parallel lines 17 is for example 25 microns. The narrow parallel lines 17 are formed extending in the normal direction to the drawing sheet in order that the intersections of the first electrode strips and the lines 17 correspond to the respective points of the matrix. The square electrode pads 15 are formed with extensions 15a at the upper left corners thereof. The narrow parallel lines (linear wiring) 17 are formed facing the extensions 15a respectively with the ferroelectric film 16 inbetween as illustrated in FIG. 5(B). The facing (overlapping) area is 25 micron×25 microns. These substrates 11 and 12 are joined with a liquid crystal material 19 therebetween. The numeral 18 designates spacers which maintain an appropriate thickness of the electro-optical modulating layer 19. The electro-optical modulating layer is provided between the electrodes 13 and 15, and comprises a material selected from the group consisting of ferroelectric liquid crystal and anti-ferroelectric liquid crystal.

The manufacturing process of this configuration requires one additional photolithographic step to the process for manufacturing the device illustrated in FIG. 4. Furthermore, the design rule of the process required is no larger than 1/5 of the width of the narrow parallel lines 17. Accordingly, the design rule is as small as 5 microns corresponding to the 25 micron thick lines. The dimension of one side of the square pads is usually several times or ten and several times the width of the narrow lines. Accordingly, it is difficult to design a very large liquid crystal panel such as a projection TV. When $C_1 \gg C_2$, the voltage $V_1$ across the liquid crystal cell LC is expressed by the following equation in the same manner as for the equation (1).

$$V_1 = -P_S S_2 / C_1 = -P_S S_2 d_1 / \epsilon_1 S_1 \qquad (7)$$

wherein relation $P_S S_2 d_1 / \epsilon_1 S_1 < 100$ is satisfied where $P_S$ is a spontaneous polarization of said ferroelectric film, $S_2$ is an area of an overlapped portion of said first pixel electrode with said second pixel electrode, $d_1$ is a thickness of said electro-optical modulating layer, $\epsilon_1$ is a dielectric constant of the material of said electro-optical modulating layer, and $S_1$ is an area of an overlapped portion of said first pixel electrode with said linear wiring.

Accordingly, the influence of cross-talking can be neglected in this case. It will be understood that almost all the voltage applied across the liquid crystal cell LC and the ferroelectric cell FE is applied to the ferroelectric cell FE. For example, the voltage $V_1$ across the liquid crystal cell LC can be elevated to 10 V if $\epsilon_2 = 10\epsilon_0$, $d_1 = 5 \times 10^{-6}$, $P_S = 10^{-2}$ C/m$^2$ and $S_1/S_2 = 50$. If the condition is not appropriately selected, however, the liquid crystal material may be destroyed. Namely, when a ferroelectric liquid crystal material or an anti-ferroelectric liquid crystal material is used, the voltage applied across the liquid crystal must not exceed 100 V. The voltage applied across the liquid crystal cell LC, however, is substantially sensitive to the variation of the ratio $S_1/S_2$. For example, if the dimension of each side of the overlapping area 20 varies by ±10%, the voltage applied across the liquid crystal may vary by about ±20%. If the dimension of each side of the overlapping area 20 varies by ±20%, the voltage applied across the liquid crystal may vary by about ±40% or more. When an excessively high voltage is inadvertently applied, the liquid crystal material may be degraded. Accordingly, care must be paid in order not to allow a substantial variation of the area even if some misalignment occurs in the mask arrangement.

The material of the ferroelectric cell FE has to be carefully selected. In the case of P(VDF+TrFE), which is a representative ferroelectric copolymer, the ferroelectric characteristics are substantially varied in accordance with the composition, i.e. the ratio of the vinylidene fluoride (VDF) to trifluoroethylene (TrFE). For example, P(VDF+TrFE) changes its polarization direction as illustrated in FIG. 1(C) showing the response time τ which is required for P(VDF+TrFE) to invert the direction of polarization in response to the voltage E applied thereto. Curve A was plotted in the case that VDF/TrFE=80/20. Curve B was plotted in the case that VDF/TrFE =50/50. These curves are on the same line in the region that 1/E<7 [m/GV] (E> 140 MV/m). Curve A, however, is positioned above curve B in the region that 1/E>7 [m/GV] (E<140 MV/m) and therefore P(VDF+TrFE) becomes sensitive to weak electric fields in the case that VDF/TrFE=50/50.

For example, in the case of the matrix driving method as illustrated in FIG. 2, one pixel is selected only for a limited period (selection time) which is a small fraction of one frame time. The duty time, i.e. the ratio of the selection time to the remaining non-selection time is the inverse of the number of rows contained in the matrix. As shown in FIG. 2, the liquid crystal cell is subjected to an effective voltage, which can be effective to invert the polarization, only for a half of the selection time. It may be the case that a ferroelectric cell FE is subjected to a voltage in the opposite direction during the non-selection time as in the case of the signal $V_A$ illustrated in FIG. 2. For example, the influence of application of electric fields during the non-selection time will be estimated in the case that the ferroelectric cell FE is subjected to a voltage of ±140 MV/m in the selection time and a voltage of ±70 MV/m in the non-selection time, that the ferroelectric cell FE is made of P(VDF+TrFE) which is prepared at the ratio of VDF/TrFE=50/50 and that the duty ratio is no larger than 1/10. In this case, the polarization of the ferroelectric cell FE is gradually inverted, when the signal $V_A$ is applied during the non-selection time longer than the selection time by one order of magnitude, whereas the ferroelectric cell FE is subjected to a voltage of ±140 MV/m only for a short effective time period no longer than 1/20 of the frame time. The effective time must be 10 microseconds or longer in order to perform inversion of polarization as understood from FIG. 1(C). The frame time is 0.1 millisecond or longer in this case.

Of course, many applications can not be realized if the duty ratio is only 1/10. The number of rows is only 20 even if the screen is composed of upper and lower separate panels. The extreme case of $V_A$ illustrated in FIG. 2, however, is particularly exceptional and therefore usually little inconvenience occurs. In practice, cross-talking takes place to a certain extent even in usual liquid crystal displays having 100 rows without substantially suffering inconvenience. This is still a drawback, considering the cost performance, when compared to TFT type liquid crystal displays.

On the other hand, when the ferroelectric cell FE is made of P(VDF+TrFE) which is prepared at the ratio of VDF/TrFE=80/20 corresponding to curve A, the situation is substantially improved. In this case, the response time is also only 10 microseconds or shorter when the ferroelectric cell FE is subjected to a voltage of ±140 MV/m. The response time is as long as several milliseconds when the ferroelectric cell FE is subjected to a voltage of ±70 MV/m. Accordingly, the duty ratio can be selected to be 1/200 to 1/500 which is sufficient for use in many wide panel displays. In comparison with TFT type liquid crystal displays capable of displaying grayscale images, this is not sufficient for competition. The displays utilizing ferroelectric liquid crystals or anti-ferroelectric liquid crystals have clear on/off characteristics which make it difficult, in turn, to display images in intermediate shades of gray. For this reason, grayscale is accomplished by controlling the effective area of the respective pixels. This technique is, however, not very excellent as compared to the requirement thereof that the number of rows and/or columns multiplies.

Even in this case, a projection TV system capable of displaying images in 16 shades of gray can be formed with pixels occupying 25 micrometers×25 micrometers areas in accordance with the minimum design rule. The design rule can be simply increased in order to form a TV system suitable for direct watching.

In accordance with the minimum design rule, however, the size of one pixel becomes as wide as 50 micrometers×55 micrometers in the case of 64 shades of gray. Patterning must be carried out in the wide area of 50 micrometers×55 micrometers which is three times the area in the case of 16 shades of gray. It is difficult to perform patterning on a wide substrate in accordance with the same design rule. Accordingly, it seems possible in practice only to manufacture liquid crystal displays capable of displaying images in 16 shades of gray.

Figure 3:
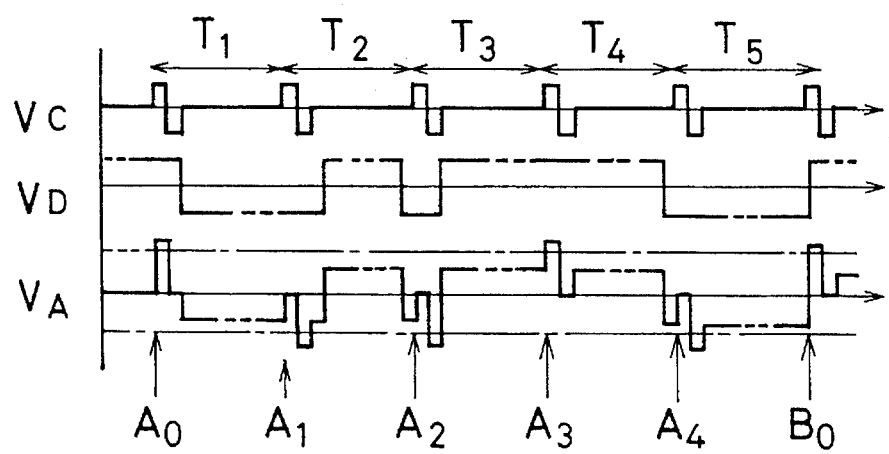
FIG. 3 is a schematic diagram showing a method of driving a liquid crystal display in accordance with the present invention.

This difficulty can be solved in accordance with the present invention by dividing the screen into a plurality of sub-frames as illustrated in FIG. 3. One frame consists of five sub-frames. In the figure, although the respective periods $T_1$ to $T_5$ are illustrated to have the same width for convenience for illustration, these periods are selected different from each other to enable to realize a variety of total time periods by selecting one or more sub-frames. The time periods $T_1$ to $T_5$ are expressed as $2^n$To, where n is an integer from 0 to 4 and To is the shortest period. For example, $T_1$=To, $T_2$=2To, $T_3$=4To, $T_4$=8To and $T_5$=16To. Of course, these sub-frames can be arbitrarily interchanged as $T_1$=To, $T_2$=16To, $T_3$=2To, $T_4$=8To and $T_5$=4To. In this case, if the ferroelectric cell FE is turned on in response to a large positive pulse and turned off in response to a large negative pulse, the total on time is To+8To when the effective voltage is applied to the ferroelectric cell FE as $V_A$ of FIG. 3.

It should be noted that the minimum effective time of large positive or negative pulses must be sufficient to allow complete inversion of the polarization of the ferroelectric cell FE. The minimum effective time is approximately calculated by dividing the shortest time period To by the number of rows. For example, in the case that one frame of 30 milliseconds consists of five sub-frames as illustrated in FIG. 3 and the voltage applied to the ferroelectric cell FE is 200 MV/m (i.e., the response time is about 1 microsecond), the shortest period To is 1 millisecond and therefore the number of rows can not exceed 500. If the voltage applied to the ferroelectric cell FE is 100 MV/m, the response time becomes about 100 microseconds so that the number of rows can not exceed 10. Accordingly, the voltage applied to the ferroelectric cell FE is preferably no lower than 140 MV/m.

On the other hand, cross-talking in the longest sub-frame (about 15 microseconds) has to be examined. The polarization of the ferroelectric cell FE is inverted within several milliseconds by signals of up to 70 MV/m caused by data signals applied for other pixels even if the ferroelectric cell FE is made of P(VDF+TrFE) prepared at the ratio of VDF/TrFE=80/20 corresponding to curve A of FIG. 1(C). The voltage applied to the ferroelectric cell FE is preferably low in this case. If the voltage applied to the ferroelectric cell FE is decreased, however, the selection time has to be increased in turn. With above situation in mind, the duty ratio must be from 1/100 to 1/500 in each sub-frame.

Figure 6:
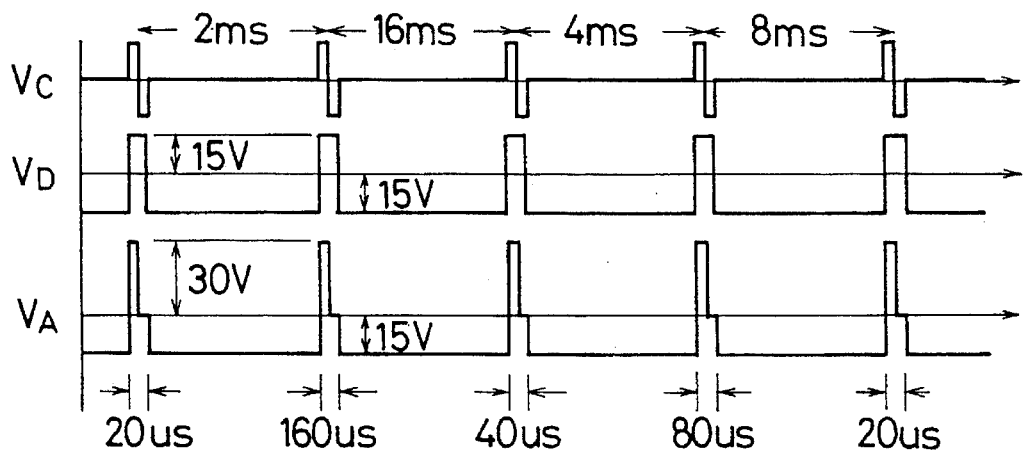
FIG. 6 is a schematic diagram showing a method of driving a liquid crystal display in accordance with a first embodiment of the present invention.

Referring now to FIG. 6, a method of driving a liquid crystal display in accordance with a first embodiment of the present invention will be explained. The liquid crystal display is designed as illustrated in FIG. 5. The size of the square pads 15 is 300 microns×250 microns. The ferroelectric film 16 is made of P(VDF+TrFE) prepared at the ratio of VDF/TrFE=80/20. The facing (overlapping) area is 25 micron×25 microns. The thickness of the ferroelectric film 16 is 200 nm. The screen is composed of a 640×200 pixels arranged in a matrix and divided into upper and lower panels. Each panel is separately driven by a driving circuit respectively. In this case, almost all the voltage applied across the liquid crystal cell LC and the ferroelectric cell FE is applied to the ferroelectric cell FE and therefore the liquid crystal cell LC is subjected only to the electric field caused by the spontaneous polarization of the ferroelectric cell FE.

In accordance with the first embodiment of the present invention, the frame is divided into 4 sub-frames as illustrated in FIG. 6. The time periods $T_1$ to $T_4$ for the first to fourth sub-frames are expressed as $2^n$To where n is an integer from 0 to 3 and To is the shortest period. The shortest period To is 2 milliseconds in this case. Namely, $T_1$=2 milliseconds, $T_2$=16 milliseconds, $T_3$=4 milliseconds and $T_4$=8 milliseconds as illustrated in FIG. 6 so that the selection times for the first to fourth sub-frames are 20 microseconds, 160 microseconds, 40 microseconds and 80 microseconds respectively. Multiplex operation is carried out for driving each sub-frame by applying selection signals Vc to the narrow lines 17 and data signals to the first electrode arrangement 13 with a duty ratio of 1/100. The data signal is set at +15 V to turn on the pixel and at −15 V to turn off the pixel. The voltage applied across the liquid crystal cell LC and the ferroelectric cell FE is then +30 V when the pixels are turned on and −30 V when the pixels are turned off. +30 V corresponds to a strong electric field of 150 MV/m (1/E=7.5 m/GV). As understood from FIG. 1(C), the spontaneous polarization of the ferroelectric cell FE can be easily inverted by the voltage of 30 V even within the shortest time of 10 microseconds.

On the other hand, cross-talking in the longest sub-frame (16 microseconds) has to be examined. It takes 10 microseconds to invert the polarization of the ferroelectric cell FE by signals of up to 7.5 MV/m (1/E=15 m/GV) caused by data signals applied for other pixels. The period of 16 microseconds (the second sub-frame) is longer than this time period. However, the extreme case of $V_A$ illustrated in FIG. 6 is particularly exceptional and therefore usually no inconvenience occurs in practice.

It is therefore possible to displays images in 16 shades of gray by selecting one or more sub-frames or no sub-frame. The signals utilized in this technique are particularly simple. The driving circuit can be formed also in a simple design which requires only a small power consumption due to the light load of the liquid crystal display. It is difficult, however, to furthermore increase the scale of the liquid crystal display. For example, if the number of pixels is increased by a factor of 5, the selection time of the first sub-frame becomes as short as 4 microseconds, only a half of which time is applied to the ferroelectric cell FE. The voltage required is as high as 170 to 200 MV/m in order to enable the ferroelectric cell FE to respond to the 2 microseconds pulse width. This means that the ferroelectric cell FE is subjected to about 100 MV/m also during he non-selection time. The response time of the ferroelectric cell FE to the electric field of 100 MV/m is about 0.1 millisecond, which is substantially long even as compared to the period of the shortest sub-frame (2 milliseconds). The contrasts of images are therefore degraded due to cross-talking.

Of course, many applications can not be realized with such a narrow matrix as 100×2 (200 rows). Larger scale liquid crystal displays can be formed by employing a method of driving a liquid crystal display in accordance with a second embodiment of the present invention as described below.

Figure 7:
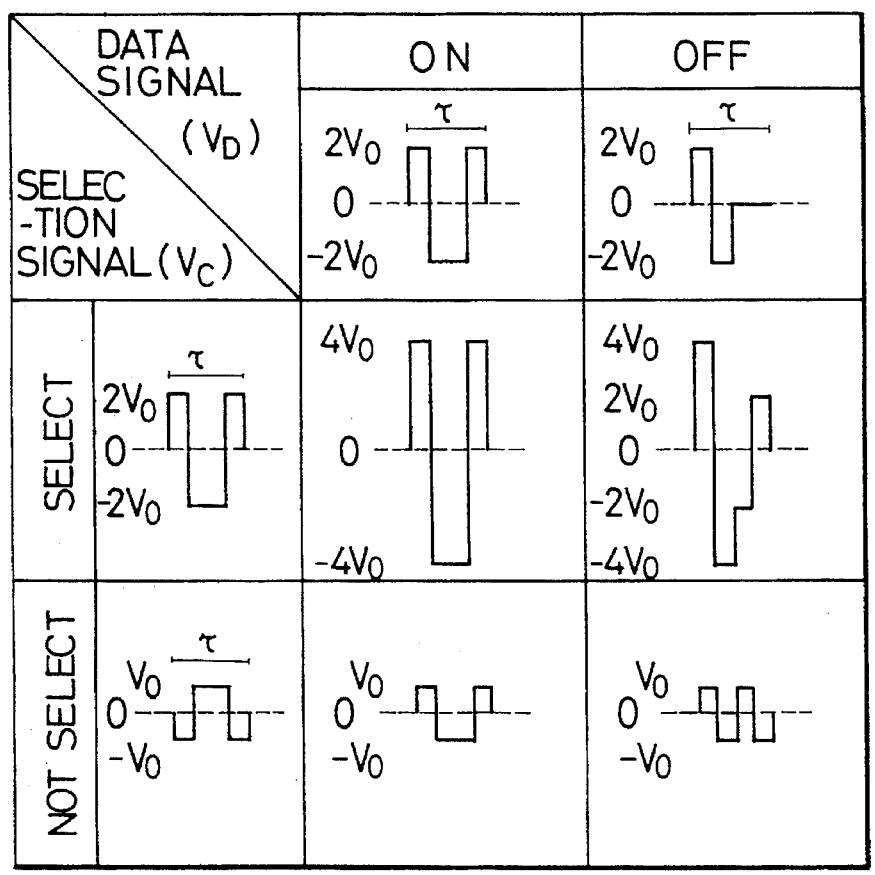
FIG. 7 is a schematic diagram showing selection signals and data signals utilized in a method of driving a liquid crystal display in accordance with a second embodiment of the present invention.

Namely, referring now to FIG. 6, the method of driving a liquid crystal display in accordance with the second embodiment of the present invention will be explained. The liquid crystal display is designed as illustrated in FIG. 5 and similar to that employed in the first embodiment except for the size of the matrix. The screen is composed of a 1024×1000 pixels arranged in a matrix and divided into upper and lower panels. Each panel is separately driven by a driving circuit respectively. In accordance with the second embodiment of the present invention, each of the signals to be supplied to the electrodes has four phases, and the signals to be applied during the selection time are as illustrated in FIG. 7. Namely, the selection signal Vc to be applied to each narrow line 17 consists of two positive pulses having a pulse width of τ/4 and a negative pulse having a pulse width of τ/2 located therebetween as illustrated in FIG. 7. The data signal $V_D$ to be applied to each parallel strip 13 of the first electrode arrangement consists of two positive pulses having a pulse width of τ/4 and a negative pulse having a pulse width of τ/2 located therebetween in the same manner for turning on the ferroelectric cell FE and a pair of positive and negative pulses having a pulse width of τ/4 followed by a 0 V period of τ/2 for turning off the ferroelectric cell as illustrated in FIG. 7. The heights of these positive and negative pulses are +2 Vo and −2 Vo. On the other hand, the signals to be applied during the non-selection time are also illustrated in FIG. 7. Namely, the selection signal Vc to be applied to each narrow line 17 consists of two negative pulses having a pulse width of τ/4 and a positive pulse having a pulse width of τ/2 located therebetween as illustrated in FIG. 7. The heights of these positive and negative pulses are +Vo and −Vo.

In accordance with this technique, called the four-pulse method, the ferroelectric cells are subjected to alternating signals during the non-selection time so that no cross-talking takes place even the non-selection time is relatively long. As seen from FIG. 7, the voltage applied to the ferroelectric cell FE during the non-selection time is four times as low as the voltage applied to the ferroelectric cell FE during the selection time. For example, when the selection signal Vc and the data signal $V_D$ consist of positive and negative pulses of 2 Vo=±20 V as illustrated in FIG. 7, the ferroelectric cell FE is subjected to pulses of ±40 V (200 MV/m) during the selection time and alternating signals of ±10 V during the non-selection time.

Figure 8:
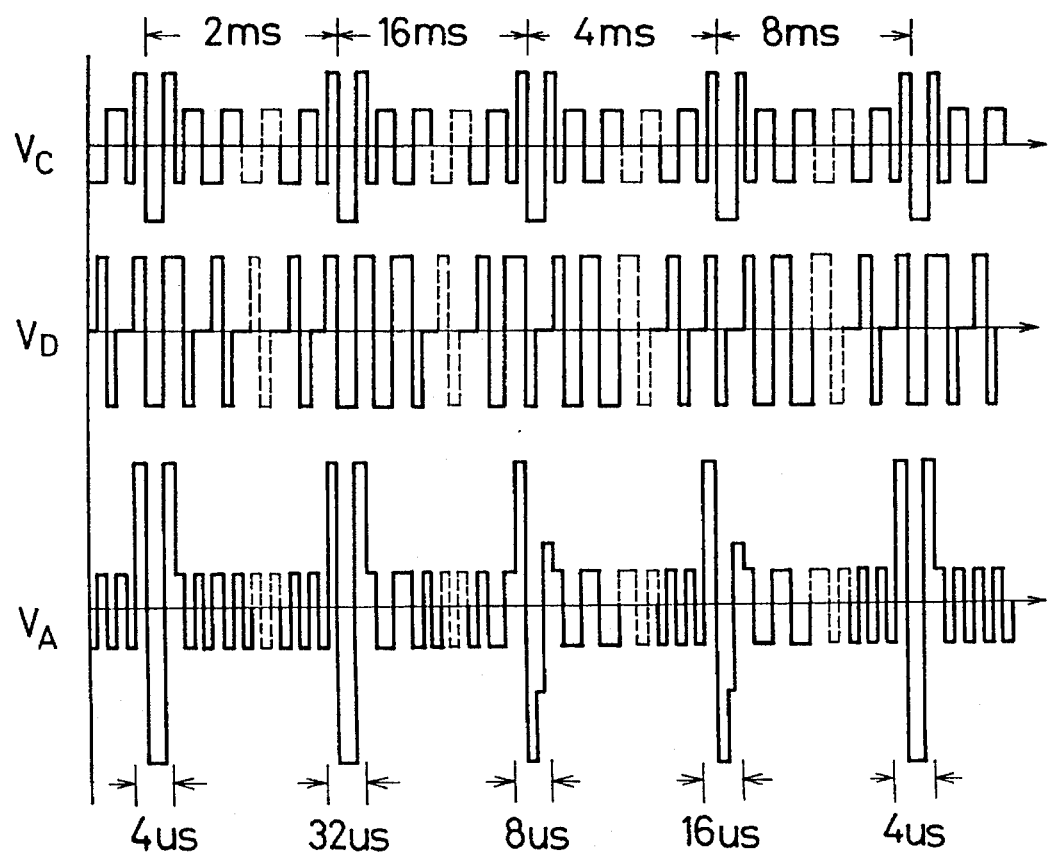
FIG. 8 is a schematic diagram showing a method of driving a liquid crystal display in accordance with a second embodiment of the present invention.

In accordance with the second embodiment of the present invention, the frame is also divided into 4 sub-frames as illustrated in FIG. 8. The time periods $T_1$ to $T_4$ for the first to fourth sub-frames are expressed as $2^n T_0$ where n is an integer from 0 to 3 and To is the shortest period. The shortest period To is 2 milliseconds also in this case. Namely, $T_1$=2 milliseconds, $T_2$=16 milliseconds, $T_3$=4 milliseconds and $T_4$=8 milliseconds as illustrated in FIG. 8 so that the selection times for the first to fourth sub-frames are 4 microseconds, 32 microseconds, 8 microseconds and 16 microseconds respectively. Multiplex operation is carried out for driving each sub-frame by applying selection signals Vc to the narrow lines 17 and data signals $V_D$ to the first electrode arrangement 13 at a duty ratio of 1/500. The pulse heights of the data signal and the selection signals are set at ±20 V. The voltage applied across the liquid crystal cell LC and the ferroelectric cell FE is then ±40 V corresponding to a high electric field of 200 MV/m. As understood from FIG. 7, since the effective pulse width of the selection signal is only ¼ of the selection time, the spontaneous polarization of the ferroelectric cell FE must be inverted within the shortest time of 1 microsecond and therefore such high pulses are employed.

Next, cross-talking in the longest sub-frame (16 microseconds) has to be examined. The signals applied to the ferroelectric cell FE during the non-selection time are only 10 V high and alternating as illustrated in FIG. 8 so that influence of the signals is not accumulated during the non-selection time. Accordingly, it is not the case that the liquid crystal cell LC is degraded or the polarization is inadvertently inverted due to the electric filed. In FIG. 8, the ferroelectric cell FE is turned on in the first and second sub-frames and turned off in the third and fourth sub-frames to represent the 9th shade of gray out of 16 shades corresponding to 0 to 15To of the total time period. This method in accordance with the second embodiment of the present invention is particularly excellent in the performance of displaying images. On the other hand, the method in accordance with the first embodiment of the present invention is advantageous in process and running cost because of the simple structure requiring a relatively small power consumption.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. For example, more than 16 shades of gray, e.g. 256 shades, can be implemented in accordance with the present invention. It will be effective in this case to make use of the area adjustment technique if necessary. For example, the number of shades can be increased by a factor of three, e.g. to 48 shades from 16 shades, by providing a pair of electrode strips for each column. The width of one of the pair is twice the width of the other of the pair.

What is claimed is:

1. An electro-optical device comprising:

a linear wiring;

a first pixel electrode;

a ferroelectric film sandwiched between said linear wiring and said first pixel electrode;

a second pixel electrode in the form of strip or plane; and an electro-optical modulating layer provided between said first pixel electrode and said second pixel electrode, said ferroelectric film being interposed between said electro-optical modulating layer and said first pixel electrode, said electro-optical modulating layer comprising a material selected from the group consisting of ferroelectric liquid crystal and anti-ferroelectric liquid crystal, wherein relation $P_S S_2 d_1 / \epsilon_1 S_1 < 100$ is satisfied where $P_S$ is a spontaneous polarization of said ferroelectric film, $S_2$ is an area of an overlapped portion of said first pixel electrode with said second pixel electrode, $d_1$ is a thickness of said electro-optical modulating layer, $\epsilon_1$ is a dielectric constant of the material of said electro-optical modulating layer, and $S_1$ is an areal of an overlapped portion of said first pixel electrode with said linear wiring.

2. The device of claim 1 wherein $d_2 \ll d_1$ where $d_2$ is a thickness of said ferroelectric film.

3. An electro-optical device comprising:

a linear wiring;

a first pixel electrode;

a ferroelectric film sandwiched between said linear wiring and said first pixel electrode;

a second pixel electrode in the form of strip or plane; and an electro-optical modulating layer provided between said first pixel electrode and said second pixel electrode, said ferroelectric film being interposed between said electro-optical modulating layer and said first pixel electrode, said electro-optical modulating layer comprising a material selected from the group consisting of ferroelectric liquid crystal and anti-ferroelectric liquid crystal, wherein said ferroelectric film comprises a material selected from the group consisting of barium titanate and $PbZr_{1-x}Ti_xO_3$.

4. An electro-optical device comprising:

a linear wiring;

a first pixel electrode;

a ferroelectric film sandwiched between said linear wiring and said first pixel electrode;

a second pixel electrode in the form of strip or plane; and an electro-optical modulating layer provided between said first pixel electrode and said second pixel electrode and between said ferroelectric film and said second pixel electrode, said electro-optical modulating layer comprising a material selected from the group consisting of ferroelectric liquid crystal and anti-ferroelectric liquid crystal, wherein said ferroelectric film comprises a material selected from the group consisting of barium titanate and $PbZr_{1-x}Ti_xO_3$ and has a thickness no smaller than 300 nm.

5. A liquid crystal display device comprising:

a pair of substrates opposed to each other;

a first plurality of conductive strips formed on one of said substrates;

a second plurality of conductive strips orthogonal to said first plurality of conductive strips and formed on the other one of said substrates, whereby a plurality of pixels are defined at each intersection of said first and second strips;

a liquid crystal material comprising a material selected from the group consisting of a ferroelectric liquid crystal, material and an anti-ferroelectric liquid crystal material and interposed between said substrates having said first and second conductive strips formed thereon; and a ferroelectric film interposed between said liquid crystal material and one of said first and second conductive strips, wherein said ferroelectric film comprises barium titanate.

6. The liquid crystal display device of claim 5 wherein said ferroelectric film covers substantially an entire area of each pixel.

7. The liquid crystal display device of claim 5 wherein said ferroelectric film has a thickness no smaller than 300 nm.

* * * * *